United States Patent [19]
Nicholl

[11] 3,720,715

[45] March 13, 1973

[54] MANUFACTURE OF METHYLAMINES

[76] Inventor: Edward McKillop Nicholl, Norton Hall, The Green, Norton, Stockton-on-Tees, England

[22] Filed: Oct. 12, 1970

[21] Appl. No.: 79,771

[30] Foreign Application Priority Data

Nov. 3, 1969    Great Britain.....................53,695/69

[52] U.S. Cl...........260/583 J, 260/583 R, 260/585 B
[51] Int. Cl..............................................C07c 85/06
[58] Field of Search.............260/583 R, 585 B, 583 J

[56] References Cited

UNITED STATES PATENTS

| | | | |
|---|---|---|---|
| 2,365,721 | 12/1944 | Olin et al. | 260/585 B |
| 2,160,058 | 5/1939 | Covert | 260/585 B X |
| 2,053,193 | 9/1936 | Guinot | 260/585 B |

*Primary Examiner*—Lewis Gotts
*Assistant Examiner*—Richard L. Raymond
*Attorney*—Cushman, Darby & Cushman

[57] ABSTRACT

Methylamines are synthesized by ammonolysis of methanol at elevated temperature and pressure and in the presence of hydrogen which suppresses formation of undesirable corrosion-inducing compounds.

7 Claims, 1 Drawing Figure

PATENTED MAR 13 1973  3,720,715
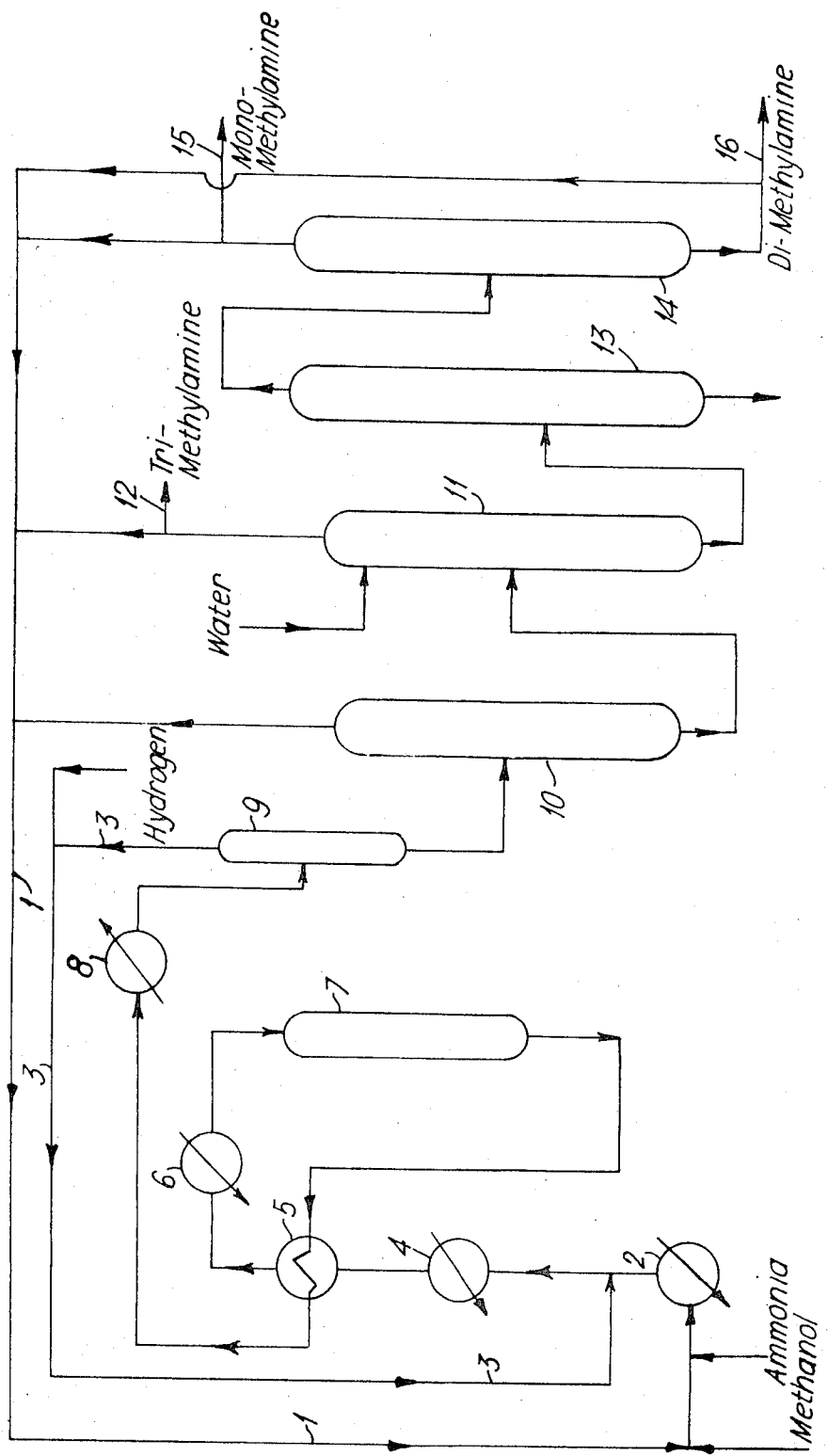

MANUFACTURE OF METHYLAMINES

The present invention relates to the manufacture of methylamines.

Alkylamines are widely manufactured and several processes are known for their manufacture. For example, an alkyl halide can be ammonolysed in solvent ether to produce the corresponding hydrohalide salts which are then decomposed to give a mixture of primary, secondary and tertiary alkyl amines. Aldehydes and ketones may also be ammonolysed in the presence of hydrogen and a catalyst such as cobalt or nickel to give a mixture containing mostly primary, secondary, and tertiary alkyl amines. Another method of manufacture, is the ammonolysis of an alcohol in the vapor phase in the presence of a catalyst which may be either a dehydration catalyst, such as alumina, or a hydrogenation catalyst such as nickel-aluminum or a copper-aluminum mixture. In ammonolysis processes for the production of ethylamines and higher amines it is found that nitriles are easily formed and therefore the reaction may be conducted in the presence of molecular hydrogen to suppress nitrile formation. Nitriles are not formed however when methylamines are produced by the ammonolysis of methanol and it is not therefore the practice to have molecular hydrogen present in this type of methylamines synthesis. Thus one process for the manufacture of methylamines consists in passing ammonia methanol and, preferably, recycled mono-, di- and trimethylamines over a dehydration catalyst, for example silica-alumina, at elevated temperature, for example in the range 400° to 450°C and at elevated pressure, for example in the range 150 p.s.i.g. to 300 p.s.i.g.

We have found that during passage of the methanol, ammonia and, if desired, recycled methylamines over the catalyst, some of the methanol is oxidized to formaldehyde. Furthermore, we have found that subsequent reaction between the formaldehyde and dimethylamine leads to formation of N,N,N', N',-tetramethyldiaminomethane (BDM). The formation of formaldehyde and BDM accounts for approximately 0.4 percent by weight of the methanol used in this process; this is a significant wastage of methanol. Of more importance, however, is our discovery that BDM is a cause of severe corrosion in the plant used for the process. We have found that as little as ½% w/w of BDM in aqueous methylamine solutions causes severe corrosion. We have now found means whereby the formation of formaldehyde and BDM with their consequent disadvantages may be suppressed.

According to the present invention, a process for manufacturing methylamines comprises ammonolysis of methanol in the vapor phase at an elevated temperature and pressure in the presence of molecular hydrogen.

By ammonolysis we mean replacement of one or more hydrogen atoms attached to a nitrogen atom in ammonia or methylamines by one or more methyl groups from methanol with the formation of one or more molecules of water.

Ammonolysis is suitably carried out using ammonia and/or methylamines. Preferably both ammonia and methylamines are used, the amines being recycled from a later stage in the process.

Preferably the molar ratio of ammonia and/or amines to methanol used lies in the range 1.5 to 1 to 8 to 1, and advantageously is about 4 to 1.

A suitable temperature of operation of the process lies in the range 350° to 500°C, preferably in the range 400° to 450°C. The process is advantageously operated at elevated pressure, suitably within the range 100 p.s.i.g. to 500 p.s.i.g, preferably 200 p.s.i.g. to 300 p.s.i.g.

The process is preferably operated catalytically, suitable catalysts being dehydration catalysts, for example alumina, silica/alumina, thoria and bauxite.

Advantageously, ammonia and hydrogen are present in an approximately equimolar ratio.

The invention will now be further described by way of example with reference to the accompanying drawing which is a simplified flow diagram of the process.

Methanol is mixed with ammonia from an outside source, and with recycled ammonia and methylamines from line 1. The mixed stream is fed to a vaporizer 2 and after vaporization it is mixed with hydrogen. The hydrogen is supplied either wholly or in part from an outside source along line 3, the remainder being hydrogen recycled along line 3 from the synthesis of the methylamines.

The combined feed is then fed to a superheater 4, a heat exchanger 5, a preheater 6 and thence to the methylamines synthesis reactor 7 containing a dehydration catalyst which operates at a temperature of about 425°C and a pressure of about 250 p.s.i.g.

After reaction, the process stream is cooled initially in heat exchanger 5 and then in cooler 8 to about 100°C. Residual hydrogen and a little ammonia are flashed off in flash drum 9 and recycled along line 3. Additional fresh hydrogen is added as necessary into line 3.

The remaining ammonia, methylamines and water formed in the reaction is fed to the ammonia column 10, which is operated at a pressure of about 250 p.s.i.g. Ammonia and some trimethylamine are separated from the product, the trimethylamine forming an azeotrope with ammonia, and this is recycled to the synthesis reactor 7 through line 1. The product from the ammonia column passes to the trimethylamine column 11, which is operated at about 150 p.s.i.g. and in which trimethylamine is separated from the product stream by an extractive distillation process with water. The trimethylamine obtained may be wholly or partially recycled through line 1 or fed to storage along line 12. The remaining product stream passes to the dehydration column 13 which is operated at about 120 p.s.i.g. and in which water is separated from mono- and dimethylamine. The mixture of amines passes from the dehydration column 13 to the distillation column 14 which operates at about 100 p.s.i.g. and in which monomethylamine is separated from dimethylamine. The monomethylamine may be wholly or partly recycled through line 1 or it may be passed to storage along line 15. The dimethylamine may be wholly or partly recycled through line 1, or it may be passed to storage along line 16.

We have found that when hydrogen is absent from the process corrosion occurs in the plant, in particular in the trimethylamine column 11 and in the dehydration column 13.

The use of hydrogen in the process reduces the amount of BDM and formaldehyde formed, and thus reduces both the wastage of methanol and the corrosion of the plant.

I claim:

1. In a process for the production of methylamines by the ammonolysis of methanol in the vapor phase at elevated temperature and pressure, the improvement whereby (a) loss of methanol by the formation of undesired formaldehyde and (b) corrosion resulting from the conversion of said formaldehyde to N,N,N',N'-tetra-methyl diaminomethane are avoided, said improvement comprising carrying out said ammonolysis in the presence of molecular hydrogen in amount sufficient to suppress the formation of said formaldehyde and N,N,N',N'-tetra-methyl diaminomethane.

2. A process as claimed in claim 1 wherein ammonolysis is carried out using both ammonia and methylamines.

3. A process as claimed in claim 1 wherein the molar ratio of ammonia and/or amines to methanol used is in the range 1.5 to 1 to 8 to 1.

4. A process as claimed in claim 1 wherein the temperature used lies in the range 350° to 500°C and the pressure used lies in the range 100 to 500 p.s.i.g.

5. A process as claimed in claim 1 wherein the process is operated in the presence of a catalyst selected from the group consisting of alumina, silica/alumina, thoria and bauxite.

6. A process as claimed in claim 1 wherein ammonia and hydrogen are present in an approximately equimolar ratio.

7. A process as claimed in claim 1 which comprises ammonolysis of methanol in the vapor phase at a temperature in the range 400° to 450°C and a pressure in the range 200 to 300 p.s.i.g. over a silica-alumina catalyst and in the presence of molecular hydrogen, wherein the molar ratio of ammonia and/or amines to methanol used is about 4 to 1 and the ammonia and hydrogen are present in about equimolar proportions.

* * * * *